(12) United States Patent
Downey et al.

(10) Patent No.: US 11,853,327 B2
(45) Date of Patent: Dec. 26, 2023

(54) SEAMLESSLY CONTAINERIZING A DATABASE

(71) Applicant: International Business Machines Corporation, Armonk, NY (US)

(72) Inventors: Phillip Harold Downey, Westleigh (AU); George Baklarz, Rockwood (CA); Thomas Hronis, Western Springs, IL (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 17/070,313

(22) Filed: Oct. 14, 2020

(65) Prior Publication Data

US 2022/0114196 A1 Apr. 14, 2022

(51) Int. Cl.
*G06F 16/28* (2019.01)
*G06F 16/21* (2019.01)
*G06F 21/62* (2013.01)
*G06F 9/54* (2006.01)

(52) U.S. Cl.
CPC .............. *G06F 16/285* (2019.01); *G06F 9/54* (2013.01); *G06F 16/214* (2019.01); *G06F 16/217* (2019.01); *G06F 21/6218* (2013.01)

(58) Field of Classification Search
CPC .... G06F 16/285; G06F 16/217; G06F 16/214; G06F 9/54; G06F 21/6218
See application file for complete search history.

(56) References Cited

U.S. PATENT DOCUMENTS

| | | | |
|---|---|---|---|
| 7,664,795 B2 | 2/2010 | Balin | |
| 7,913,105 B1* | 3/2011 | Ganesh | G06F 11/3006 709/224 |
| 8,161,172 B2 | 4/2012 | Reisman | |
| 9,183,032 B2 | 11/2015 | Agarwal | |
| 9,336,060 B2 | 5/2016 | Nori | |
| 10,095,489 B1 | 10/2018 | Lieberman | |
| 2014/0164699 A1* | 6/2014 | Resch | G06F 12/023 711/114 |
| 2015/0120780 A1* | 4/2015 | Jain | H04L 41/02 707/783 |
| 2015/0128105 A1 | 5/2015 | Sethi | |
| 2016/0330277 A1 | 11/2016 | Jain | |
| 2020/0004609 A1* | 1/2020 | Ambichl | G06F 9/44521 |
| 2020/0104377 A1* | 4/2020 | Earnesty, Jr. | G06F 9/4843 |
| 2020/0319871 A1* | 10/2020 | Fitzer | G06F 8/61 |

FOREIGN PATENT DOCUMENTS

| | | |
|---|---|---|
| CN | 104573121 A | 4/2015 |
| CN | 104573123 A | 4/2015 |
| CN | 104899333 A | 9/2015 |
| CN | 104573122 B | 10/2017 |
| CN | 109408115 A | 3/2019 |

* cited by examiner

*Primary Examiner* — Apu M Mofiz
*Assistant Examiner* — Farhad Agharahimi
(74) *Attorney, Agent, or Firm* — Gavin Giraud (57) ABSTRACT

In an approach to containerizing an existing database that currently resides on a standard operating system, responsive to determining that a non-containerized database is suitable for containerization, one or more database objects to be shifted into a container are determined. The one or more database objects are mapped to a container structure. The non-containerized database is shifted into the container based on the mapping of the one or more database objects and the container structure to create a containerized database.

20 Claims, 4 Drawing Sheets

SEAMLESSLY CONTAINERIZING A DATABASE

BACKGROUND

The present invention relates generally to the field of database system architectures, and more particularly to containerizing an existing database that currently resides on a standard operating system.

A database is an organized collection of data, generally stored and accessed electronically from a computer system. Where databases are more complex they are often developed using formal design and modeling techniques. A database management system (DBMS) is the software that interacts with end users, applications, and the database itself to capture and analyze the data. The DBMS software additionally encompasses the core facilities provided to administer the database. The sum total of the database, the DBMS and the associated applications can be referred to as a "database system". Often the term "database" is also used to loosely refer to any of the DBMS, the database system or an application associated with the database.

A container is a standard unit of software that packages up code and all its dependencies so the application runs quickly and reliably from one computing environment to another. A container image is a lightweight, standalone, executable package of software that includes everything needed to run an application: code, runtime, system tools, system libraries and settings. A container consists of an entire runtime environment: an application, plus all of its dependencies, libraries, and other binaries, and configuration files it needs to run, bundled into one package. By containerizing the application platform and its dependencies, differences in operating system distributions and underlying infrastructure are abstracted away.

SUMMARY

Embodiments of the present invention disclose a method, a computer program product, and a system for containerizing an existing database that currently resides on a standard operating system. In one embodiment, responsive to determining that a non-containerized database is suitable for containerization, one or more database objects to be shifted into a container are determined. The one or more database objects are mapped to a container structure. The non-containerized database is shifted into the container based on the mapping of the one or more database objects and the container structure to create a containerized database.

DETAILED DESCRIPTION

Containerization is described as a technology that allows a user to package and isolate an application with its entire runtime environment, i.e., all the files necessary for execution. Non-containerized databases are confined by the traditional, non-containerized operating systems that they run on. They are not universal or agile. They cannot be moved or scaled without significant effort or time. They do not offer universal resiliency or elasticity. Moving these non-containerized databases to a containerized environment resolves these shortcomings.

However, migrating a database from a Linux®, Unix®, or Windows environment to a containerized environment is tedious and error prone. It requires redeploying the database atop the container, which is a manual process, via a standard backup and restore process. It also requires reconfiguration of the system. Databases contain data, a data definition language, and security information in addition to database configurations relating to database performance, function security, and non-functional activities such as log archiving, dual logging, database encryption etc. Database vendors require migration of the database but do not migrate the settings for the user; this needs to be a separate activity. The drawbacks of these other solutions are they are slow, they often require manual reconfiguration, require backup and restoration of the database, and introduce data security risks. In addition, their overall total cost of ownership is much higher and requires more skills to move the database environment.

The purpose of the present invention is to containerize an existing database that currently resides on a standard operating system and move the database to a containerized environment. The present invention shifts the key database objects and configurations of a non-containerized database into a container and provides access to the database without having to go through these processes. This makes the database faster, more secure, and lower risk.

The present invention shifts the elements of a non-containerized database into a containerized environment on the fly. To accomplish this, the present invention includes a database shift analysis tool which validates the compatibility of the database into a containerized environment. The tool also recommends any changes to the database structure for any databases that are not deemed candidates for the migration. Should the changes be facilitated after analysis, the tool allows the user to proceed and containerize the database.

The present invention provides a Graphical User Interface (GUI) or a Command Line Interface (CLI) to allow a user to evaluate the suitability of the database for containerization and to recommend changes if required. The GUI allows the user to select or create references to source and target databases and configure the methods of data transfer as well as the ability to parallelize the process of the containerization. The GUI also allows the user to assess the compatibility of values between the source and target systems and override or amend settings in the transfer so that they are compatible or optimized in the target environment.

The present invention then automatically generates code based on the analysis and amended configuration and settings to containerize the database objects and apply any configuration changes into a container. This can be performed whether the non-containerized, or source, database is online or in an offline state.

The present invention then automatically generates code based on the analysis to containerize the database objects and configurations into a container. This can be performed whether the non-containerized, or source, database is online or in an offline state.

Figure 1:
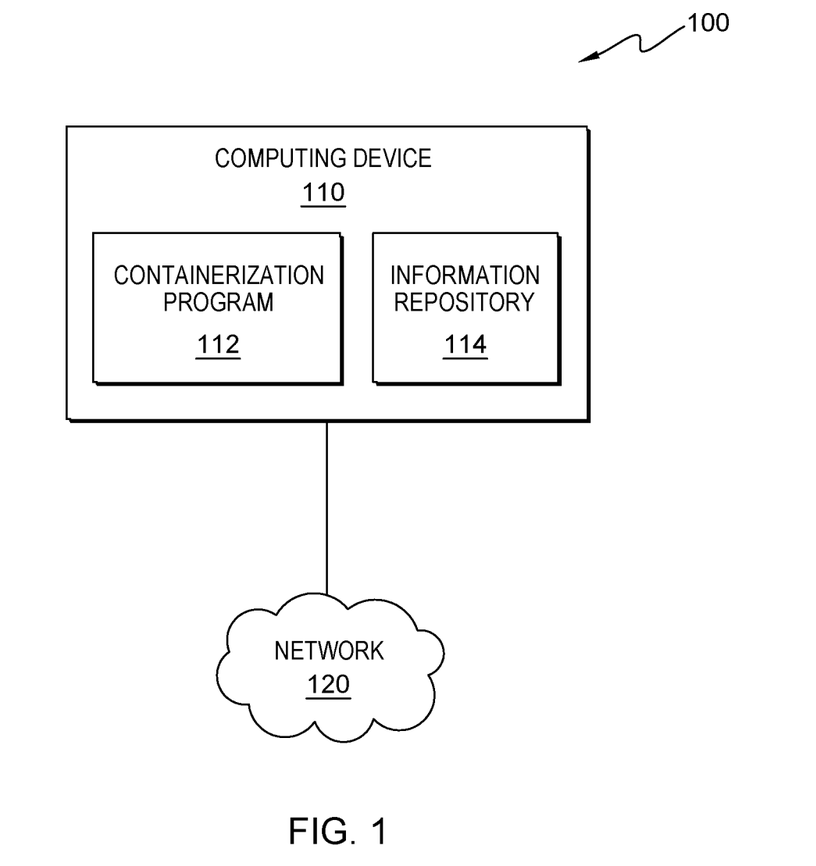
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of containerization program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes containerization program 112. In an embodiment, containerization program 112 is a program, application, or subprogram of a larger program for containerizing an existing database that currently resides on a standard operating system. In an alternative embodiment, containerization program 112 may be located on any other device accessible by computing device 110 via network 120.

In an embodiment, computing device 110 includes information repository 114. In an embodiment, information repository 114 may be managed by containerization program 112. In an alternate embodiment, information repository 114 may be managed by the operating system of the device, alone, or together with, containerization program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, database configuration data, database data, container data, operating system data, configuration data, and other data that is received by containerization program 112 from one or more sources, and data that is created by containerization program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, a NoSQL database, an object-oriented database, or one or more tables.

Figure 2:
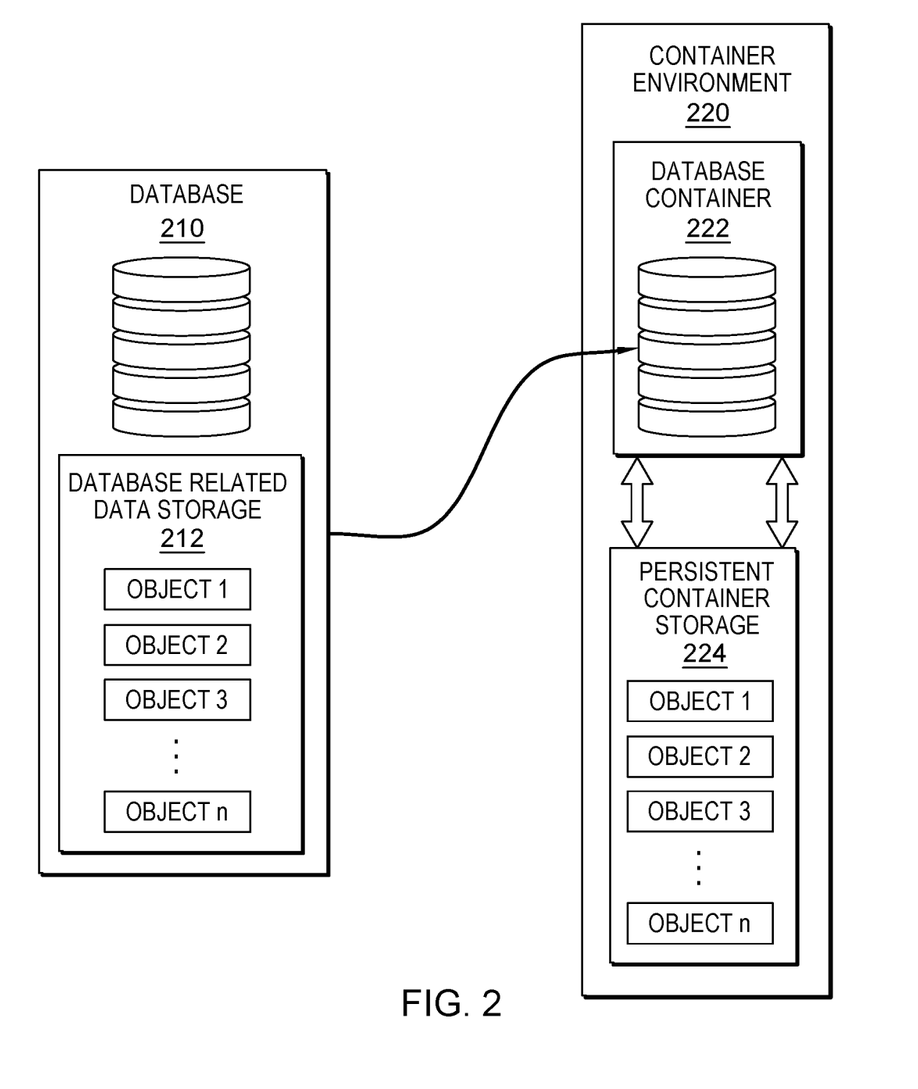
FIG. 2 is an example of containerizing a database, in accordance with an embodiment of the present invention.

FIG. 2 is an example of containerizing a database. FIG. 2 includes database 210, the database on a conventional operating system that does not natively support containerization. Container environment 220 is created by containerization program 112 from database 210. Container environment 220 contains database container 222, which is the containerized version of database 210. Database 210 includes database related data storage 212, which includes objects 1 through n. In an embodiment, n is any number of objects. These are critical objects in the database that need to be identified and moved to the containerized database by the invention. These objects are identified in the analysis phase of the process. These objects are moved to the persistent container storage 224 of container environment 220 by containerization program 112.

It should be noted that this figure is provided for illustrative purposes only. Many modifications and variations will be apparent to those of ordinary skill in the art without departing from the scope and spirit of the invention. The process illustrated in FIG. 2 is described below.

Figure 3:
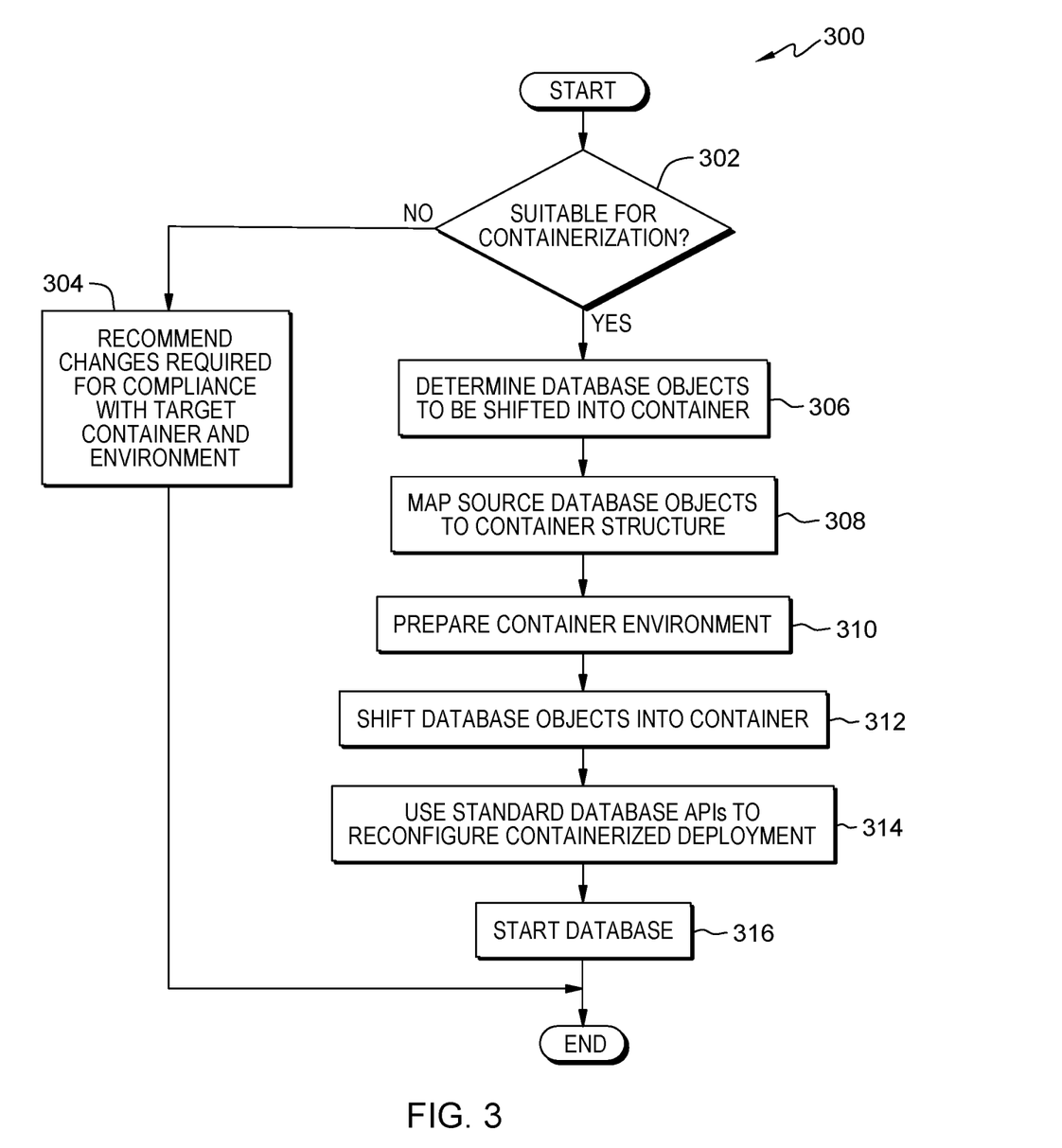
FIG. 3 is a flowchart depicting operational steps of the containerization program, on a computing device within the distributed data processing environment of FIG. 1, for containerizing an existing database that currently resides on a standard operating system, in accordance with an embodiment of the present invention.

FIG. 3 is a flow chart diagram of workflow 300 depicting operational steps for containerization program 112 for containerizing an existing database that currently resides on a standard operating system in accordance with at least one embodiment of the invention. In an alternative embodiment, the steps of workflow 300 may be performed by any other program while working with containerization program 112. In an embodiment, containerization program 112 analyzes the suitability of a source database for containerization. In an embodiment, if containerization program 112 determines that the database is not suitable for containerization, then containerization program 112 sends a notification to the user with recommendations of changes required for compliance with the target container and environment. In an embodiment, if containerization program 112 determines that the database is suitable for containerization, then containerization program 112 determines the number and location of database objects that need to be shifted into the container. In an embodiment, containerization program 112 maps the objects from the source database into the appropriate container structure for the target container environment. In an embodiment, containerization program 112 prepares a container environment to accept the database objects that were mapped in the previous step. In an embodiment, containerization program 112 shifts the database objects to into container and amends the database and instance configurations to properly locate objects in the container paths. In an embodiment, containerization program 112 uses the standard database application programming interface (API) of the source database to reconfigure the containerized deployment to match the source database.

It should be appreciated that embodiments of the present invention provide at least for containerizing an existing database that currently resides on a standard operating system. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Containerization program 112 determines if the database is suitable for containerization (decision block 302). In an embodiment, containerization program 112 analyzes the suitability of a source database, e.g., database 210 from FIG. 2, for containerization. In an embodiment, containerization program 112 analyzes the CPU, memory, and critical functions that are not supported by the container database, e.g., database environment 220 from FIG. 2. In various embodiments, these critical functions may include, but are not limited to user defined functions; database extensions, e.g., spatial; text extensions; federation; artificial intelligence; and machine learning. In an embodiment, containerization program 112 uses analytical and rule-based assertions to determine compatibility. In various embodiments, these analytical and rule based assertions may include, but are not limited to, compute, storage and memory requirements for the service; database versioning; massively parallel processing and shared nothing configuration requirements; and differences between source and container. In various embodiments, these analytical and rule-based assertions may also include various capacity, operational configurations and settings that are required including, but not restricted to, memory settings, database service configuration and storage configuration. In some embodiments, other rules include functionality, version pre-requisites, etc., that ensure compatibility between the source database and the containerized database. In an embodiment, containerization program 112 determines any changes required to be compliant with the target container and environment.

In an embodiment, containerization program 112 provides a GUI or a CLI to allow a user to interact with containerization program 112. In an embodiment, the GUI enables the user to evaluate the suitability of the database for containerization and to recommend changes if required. In an embodiment, the CLI can be run remotely from computing device 110 in environments which cannot use a GUI, and the CLI can be automated as part of a landscape move, provided the remote CLI can connect to computing device 110 via network 120.

In an embodiment, if containerization program 112 determines that the database is not suitable for containerization ("no" branch, decision block 302), then containerization program 112 proceeds to step 304. In an embodiment, if containerization program 112 determines that the database is suitable for containerization ("yes" branch, decision block 302), then containerization program 112 proceeds to step 306.

Containerization program 112 recommends changes required for compliance with the target container and environment (step 304). Containerization program 112 sends a notification to the user with recommendations of changes required for compliance with the target container and environment. This enables the user to modify the database and re-submit it to containerization program 112. In various embodiments, these changes required for compliance with the target container and environment may include, but are not limited to, activation in the container of non-default configurations such as query parallelism; federation; encryption key store management; communication buffers; and other non-default container settings of the database or database instance configuration that are required to ensure compatibility during the containerization process. Containerization program 112 then ends for this session.

Containerization program 112 determines the database objects to be shifted into the container (step 306). In an embodiment, containerization program 112 determines the number and location of database objects, e.g., Object 1 . . . n of persistent container storage 224 from FIG. 2, that need to be shifted into the container. In an embodiment, containerization program 112 uses database information from the non-containerized source database to locate all database objects to be transferred via database an API or configuration files.

In an embodiment, containerization program 112 uses database APIs or calls to locate storage that contains critical database objects such as objects or directories containing key data. In various embodiments, the objects that need to be shifted may include, but are not limited to, encryption keys and stores; database tables; database logs; database externalized functions; database configuration metadata; and required application libraries. Based on the objects and the level of granularity of objects to be moved, containerization program 112 determines the level of appropriate parallelization of the containerization process to optimize containerization elapsed time.

Containerization program 112 maps the source database objects to the container structure (step 308). In an embodiment, containerization program 112 maps the objects from the source database, e.g., database 210 from FIG. 2, into the appropriate container structure for the target container environment, e.g., persistent container storage 224 from FIG. 2. In an embodiment, the database objects include, but are not restricted to, storage paths and pools; storage containers; encryption key stores and keys; active and archived database logs; external database functions; database configuration files; user defined external functions; other critical database objects; and associated database external files.

Containerization program 112 prepares the container environment (step 310). In an embodiment, containerization program 112 prepares a container environment, e.g., container environment 220 from FIG. 2, to accept the database objects that were mapped in step 308. In an embodiment, containerization program 112 creates the directory structures and adds required permissions to the container environment.

Containerization program 112 shifts the database objects into the container (step 312). In an embodiment, containerization program 112 shifts the database objects to into container and amends the database configuration and instance configuration to properly locate objects in the container paths. In an embodiment, containerization program 112 amends the migration version level of the database, i.e., the version level or modification level of the database being sourced, if required. In an embodiment, this is done to ensure compatibility and to determine if an upgrade is required, and if so, any additional source libraries that need to be transported to support the upgrade process.

Containerization program 112 uses standard database APIs to reconfigure containerized deployment (step 314). In an embodiment, containerization program 112 uses the standard database APIs of the source database to reconfigure the containerized deployment to match the source database. In an embodiment, these reconfigurations may include, but are not limited to, query parallelism settings, buffer settings, or federation settings. In an embodiment, containerization program 112 applies instance configuration changes if the analyzer identifies changes that are required, or the operator chooses to amend a setting for the target environment. In an embodiment, these changes may include, but are not limited to, changes to metadata on the new location of database objects, or directory paths, etc., that the database requires to access all objects or workspaces in the container environment.

Containerization program 112 starts the database (step 316). In an embodiment, containerization program 112 starts the database application in the containerized environment. In an embodiment, containerization program 112 applies database configuration changes to the containerized database application. In an embodiment, containerization program 112 applies High Availability (HA) services to come online. In an embodiment, the HA or resilience services constantly monitor the databases heartbeat and if it is down or unresponsive, the HA services restarts the database in the container before restarting the container if required.

In an embodiment, containerization program 112 amends the container environment security authentication services to support database authentication. In an embodiment, database containers may be attached to an external authentication mechanism or have a self-contained authentication mechanism. In an embodiment, this step assesses the nature of the authentication mechanism and makes the appropriate additions or configurations required for the container to authenticate in the same way as the source and applies any database level authorizations required for compliance.

In an embodiment, when the database is active, containerization program 112 resets or creates any objects in the database that are needed to pair the database with any attached console, monitoring tool, GUI or CLI, and signals to the tool that there is a new database in the container and that the tool needs to update its view, and create any necessary monitoring or code artifacts that are required for the database, immediately.

Figure 4:
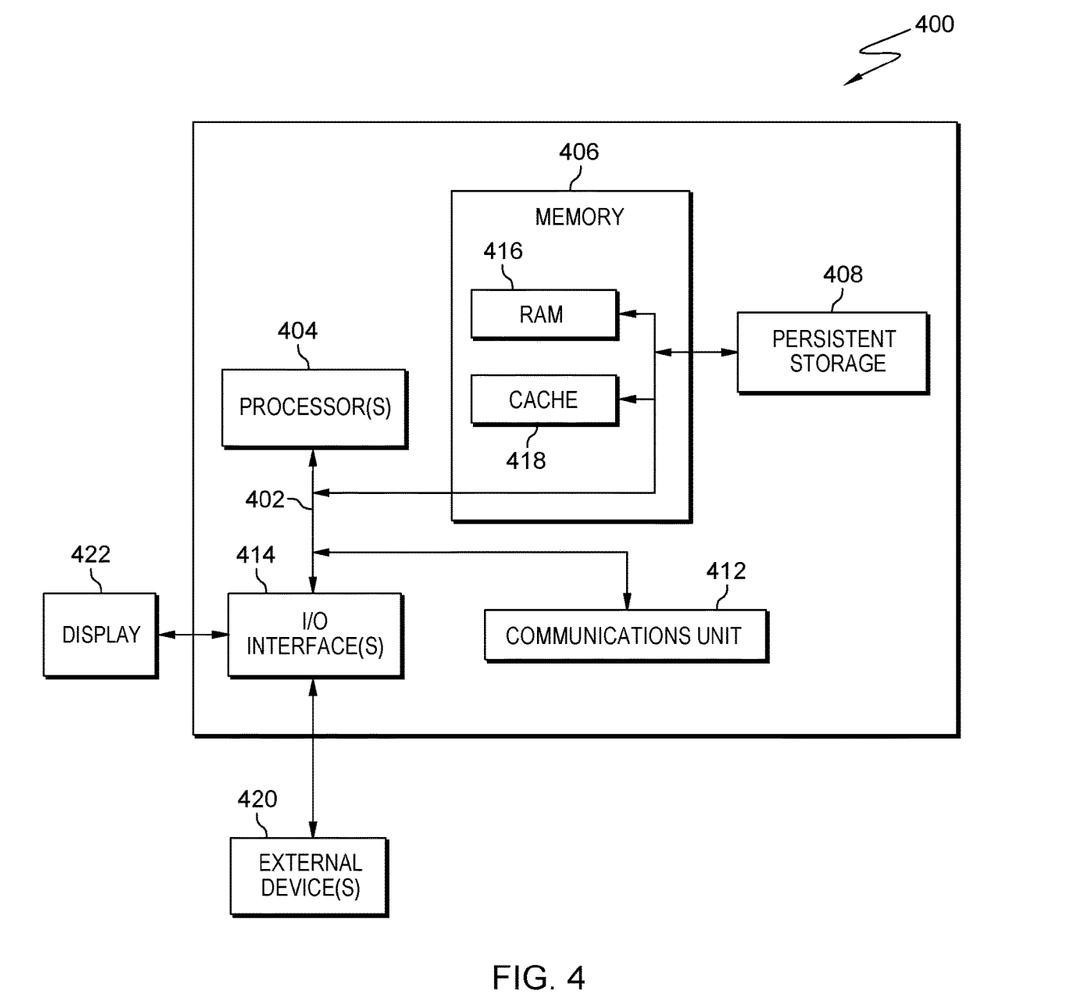
FIG. 4 depicts a block diagram of components of the computing devices executing the containerization program within the distributed data processing environment of FIG. 1, in accordance with an embodiment of the present invention.

FIG. 4 is a block diagram depicting components of computing device 110 suitable for containerization program 112, in accordance with at least one embodiment of the invention. FIG. 4 displays computer 400; one or more processor(s) 404 (including one or more computer processors); communications fabric 402; memory 406, including random-access memory (RAM) 416 and cache 418; persistent storage 408; communications unit 412; I/O interfaces 414; display 422; and external devices 420. It should be appreciated that FIG. 4 provides only an illustration of one embodiment and does not imply any limitations with regard to the environments in which different embodiments may be implemented. Many modifications to the depicted environment may be made.

As depicted, computer 400 operates over communications fabric 402, which provides communications between computer processor(s) 404, memory 406, persistent storage 408, communications unit 412, and I/O interface(s) 414. Communications fabric 402 may be implemented with any architecture suitable for passing data or control information between processors 404 (e.g., microprocessors, communications processors, and network processors), memory 406, external devices 420, and any other hardware components within a system. For example, communications fabric 402 may be implemented with one or more buses.

Memory 406 and persistent storage 408 are computer readable storage media. In the depicted embodiment, memory 406 comprises RAM 416 and cache 418. In general, memory 406 can include any suitable volatile or non-volatile computer readable storage media. Cache 418 is a fast memory that enhances the performance of processor(s) 404 by holding recently accessed data, and near recently accessed data, from RAM 416.

Program instructions for containerization program 112 may be stored in persistent storage 408, or more generally, any computer readable storage media, for execution by one or more of the respective computer processors 404 via one or more memories of memory 406. Persistent storage 408 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. In the context of some embodiments of the present invention, the source of the various input data may be physically remote to computer 400 such that the input data may be received, and the output similarly transmitted via communications unit 412.

I/O interface(s) 414 allows for input and output of data with other devices that may be connected to computer 400. For example, I/O interface(s) 414 may provide a connection to external device(s) 420 such as a keyboard, a keypad, a touch screen, a microphone, a digital camera, and/or some other suitable input device. External device(s) 420 can also include portable computer readable storage media such as, for example, thumb drives, portable optical or magnetic disks, and memory cards. Software and data used to practice embodiments of the present invention, e.g., containerization program 112, can be stored on such portable computer readable storage media and can be loaded onto persistent storage 408 via I/O interface(s) 414. I/O interface(s) 414 also connect to display 422.

Display 422 provides a mechanism to display data to a user and may be, for example, a computer monitor. Display 422 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for containerizing a database, the computer-implemented method comprising:
    responsive to a determination that a non-containerized database is suitable for a containerization, determining, by one or more computer processors, one or more database objects, directories, and configurations of the non-containerized database to be shifted into a container, wherein the container consists of an application, dependencies of the application, libraries, binaries, and configuration files for the application;
    creating a container structure as a containerized version of the non-containerized database;
    mapping, by the one or more computer processors, the one or more database objects to the container structure; and
    shifting, by the one or more computer processors, the non-containerized database into the container and amending the database configuration and instance configuration to properly locate objects in the container paths based on a mapping of the one or more database objects and the container structure to create a containerized database.

2. The computer-implemented method of claim 1, wherein responsive to determining that the non-containerized database is suitable for the containerization, determining the one or more database objects to be shifted into the container further comprises:
    providing, by the one or more computer processors, a user interface, wherein the user interface is selected from the group consisting of a graphical user interface and a command line interface; and
    enabling, by the one or more computer processors, the user to evaluate a suitability of the non-containerized database for the containerization and to recommend one or more changes if required based on an input from the user interface.

3. The computer-implemented method of claim 2, further comprising resetting, by the one or more computer processors, any database objects of the one or more database objects that are required to connect the containerized database with the user interface.

4. The computer-implemented method of claim 1, wherein shifting the non-containerized database into the container based on the mapping of the one or more database objects and the container structure to create the containerized database further comprises:
    preparing, by the one or more computer processors, a container environment, wherein the container environment is prepared to accept the one or more database objects;
    reconfiguring, by the one or more computer processors, the container environment to match an environment of the non-containerized database; and
    starting, by the one or more computer processors, the containerized database.

5. The computer-implemented method of claim 4, wherein reconfiguring the container environment to match the environment of the non-containerized database further comprises using one or more standard database application programming interfaces of the non-containerized database to query a selection from the group consisting of: parallelism settings, buffer settings, and federation settings.

6. The computer-implemented method of claim 4, wherein starting the containerized database further comprises amending, by the one or more computer processors, one or more container environment security authentication services to support a database authentication for the containerized database.

7. The computer-implemented method of claim 4, wherein starting the containerized database further comprises applying, by the one or more computer processors, one or more high availability services to the containerized database, wherein the one or more high availability services constantly monitor the database and restarts the database if it is unresponsive.

8. A computer program product for containerizing a database, the computer program product comprising one or more computer readable storage media and program instructions stored on the one or more computer readable storage media, the program instructions including instructions to:
    responsive to a determination that a non-containerized database is suitable for a containerization, determine one or more database objects, directories, and configurations of the non-containerized database to be shifted into a container, wherein the container consists of an application, dependencies of the application, libraries, binaries, and configuration files for the application;
    create a container structure as a containerized version of the non-containerized database;
    map the one or more database objects to the container structure; and
    shift the non-containerized database into the container and amending the database configuration and instance configuration to properly locate objects in the container paths based on a mapping of the one or more database objects and the container structure to create a containerized database.

9. The computer program product of claim 8, wherein responsive to the determination that the non-containerized database is suitable for the containerization, determine the one or more database objects to be shifted into the container further comprises program instructions, stored on the one or more computer readable storage media, to:
    provide a user interface, wherein the user interface is selected from the group consisting of a graphical user interface and a command line interface; and
    enable the user to evaluate a suitability of the non-containerized database for the containerization and to recommend one or more changes if required based on an input from the user interface.

10. The computer program product of claim 9, further comprises program instructions, stored on the one or more computer readable storage media, to reset any database objects of the one or more database objects that are required to connect the containerized database with the user interface.

11. The computer program product of claim 8, wherein shift the non-containerized database into the container based on the mapping of the one or more database objects and the container structure to create the containerized database further comprises program instructions, stored on the one or more computer readable storage media, to:

prepare a container environment, wherein the container environment is prepared to accept the one or more database objects;

reconfigure the container environment to match an environment of the non-containerized database; and start the containerized database.

12. The computer program product of claim 11, wherein reconfigure the container environment to match the environment of the non-containerized database further comprises program instructions, stored on the one or more computer readable storage media, to use one or more standard database application programming interfaces of the non-containerized database to query a selection from the group consisting of parallelism settings, buffer settings, and federation settings.

13. The computer program product of claim 11, wherein start the containerized database further comprises program instructions, stored on the one or more computer readable storage media, to amend one or more container environment security authentication services to support a database authentication for the containerized database.

14. The computer program product of claim 11, wherein start the containerized database further comprises program instructions, stored on the one or more computer readable storage media, to apply one or more high availability services to the containerized database, wherein the one or more high availability services constantly monitor the database and restarts the database if it is unresponsive.

15. A computer system for containerizing a database, the computer system comprising:

one or more computer processors;

one or more computer readable storage media; and program instructions stored on the one or more computer readable storage media for execution by at least one of the one or more computer processors, the stored program instructions including instructions to:

responsive to a determination that a non-containerized database is suitable for a containerization, determine one or more database objects, directories, and configurations of the non-containerized database to be shifted into a container, wherein the container consists of an application, dependencies of the application, libraries, binaries, and configuration files for the application;

create a container structure as a containerized version of the non-containerized database;

map the one or more database objects to the container structure; and shift the non-containerized database into the container and amending the database configuration and instance configuration to properly locate objects in the container paths based on a mapping of the one or more database objects and the container structure to create a containerized database.

16. The computer system of claim 15, wherein responsive to the determination that the non-containerized database is suitable for the containerization, determine the one or more database objects to be shifted into the container further comprises program instructions, stored on the one or more computer readable storage media, to:

provide a user interface, wherein the user interface is selected from the group consisting of a graphical user interface and a command line interface; and enable the user to evaluate a suitability of the non-containerized database for the containerization and to recommend one or more changes if required based on an input from the user interface.

17. The computer system of claim 16, further comprises program instructions, stored on the one or more computer readable storage media, to reset any database objects of the one or more database objects that are required to connect the containerized database with the user interface.

18. The computer system of claim 15, wherein shift the non-containerized database into the container based on the mapping of the one or more database objects and the container structure to create the containerized database further comprises program instructions, stored on the one or more computer readable storage media, to:

prepare a container environment, wherein the container environment is prepared to accept the one or more database objects;

reconfigure the container environment to match an environment of the non-containerized database; and start the containerized database.

19. The computer system of claim 18, wherein reconfigure the container environment to match the environment of the non-containerized database further comprises program instructions, stored on the one or more computer readable storage media, to use one or more standard database application programming interfaces of the non-containerized database to query a selection from the group consisting of parallelism settings, buffer settings, and federation settings.

20. The computer system of claim 18, wherein start the containerized database further comprises one or more of the following program instructions, stored on the one or more computer readable storage media, to amend one or more container environment security authentication services to support a database authentication for the containerized database.

* * * * *